(12) United States Patent
Barberis et al.

(10) Patent No.: US 11,420,467 B2
(45) Date of Patent: Aug. 23, 2022

(54) LOW-FRICTION SEALING DEVICE FOR WHEEL HUB ASSEMBLIES CONNECTED TO CONSTANT-VELOCITY JOINTS

(71) Applicant: Aktiebolaget SKF, Gothenburg (SE)

(72) Inventors: Giorgio Barberis, Volpiano (IT); Fabio Nosenzo, Asti (IT)

(73) Assignee: AKTIEBOLAGET SKF, Gothenburg (SE)

( * ) Notice: Subject to any disclaimer, the term of this patent is extended or adjusted under 35 U.S.C. 154(b) by 344 days.

(21) Appl. No.: 16/561,205

(22) Filed: Sep. 5, 2019

(65) Prior Publication Data

US 2020/0079150 A1 Mar. 12, 2020

(30) Foreign Application Priority Data

Sep. 10, 2018 (IT) .......................... 102018000008427

(51) Int. Cl.
*B60B 27/00* (2006.01)
*F16J 15/3204* (2016.01)
*F16D 3/84* (2006.01)

(52) U.S. Cl.
CPC ....... *B60B 27/0073* (2013.01); *F16J 15/3204* (2013.01); *B60B 2900/112* (2013.01);
(Continued)

(58) Field of Classification Search
CPC ......... B60B 27/0073; B60B 2900/5114; B60B 2900/5112; B60B 2900/212;
(Continued)

(56) References Cited

U.S. PATENT DOCUMENTS 8,956,054 B2 * 2/2015 Niebling ............. B60B 27/0073
384/564
10,527,090 B2 * 1/2020 Edelmann ............. F16C 43/045
(Continued)

FOREIGN PATENT DOCUMENTS

DE 102012207054 A1 10/2013
EP 2042755 A2 4/2009
(Continued)

OTHER PUBLICATIONS

Written Opinion from the Italian Patent Office dated Apr. 3, 2019 in related Italian application No. 102018000008427, and partial translation thereof.

*Primary Examiner* — Eugene G Byrd
(74) *Attorney, Agent, or Firm* — J-Tek Law PLLC; Scott T. Wakeman; Mark A. Ussai

(57) ABSTRACT

A sealing device for wheel hubs connected to constant-velocity joints including a first sealing assembly arranged between inner and outer rings of the wheel hub, and a second sealing assembly mounted on the inner ring and straddling the wheel hub and an outer ring of the constant-velocity joint. The first sealing assembly has a signal generating element having an annular insert mounted externally on a shield facing the constant-velocity joint and extending axially projecting above part of an annular step formed, on the same side as the constant-velocity joint, on a radially outer side surface of the inner ring, in a position immediately adjacent to the sleeve portion of the first shield. The second sealing assembly includes a tubular support keyed onto the inner ring by its first end on the outside edge folded in the manner of an L and shaped to engage inside the annular insert.

10 Claims, 1 Drawing Sheet

(52) U.S. Cl.
CPC ... *B60B 2900/113* (2013.01); *B60B 2900/211* (2013.01); *B60B 2900/212* (2013.01); *B60B 2900/5112* (2013.01); *B60B 2900/5114* (2013.01); *F16D 3/84* (2013.01); *F16D 2300/08* (2013.01)

(58) Field of Classification Search
CPC .......... B60B 2900/113; B60B 2900/112; F16J 15/3204; F16D 2300/08; F16D 3/84
See application file for complete search history.

(56) References Cited

U.S. PATENT DOCUMENTS

| | | | | |
|---|---|---|---|---|
| 2013/0001888 | A1* | 1/2013 | Rossi | B60B 27/0036 277/549 |
| 2013/0283954 | A1* | 10/2013 | Niebling | B60B 27/0084 74/434 |
| 2014/0374996 | A1* | 12/2014 | Duch | B60B 27/0073 277/562 |
| 2014/0376848 | A1* | 12/2014 | Duch | F16C 33/80 384/448 |
| 2015/0069825 | A1* | 3/2015 | Duch | F16C 33/768 301/109 |
| 2015/0233734 | A1* | 8/2015 | Niebling | G01D 5/14 324/207.25 |
| 2016/0152072 | A1* | 6/2016 | Duch | F16C 41/007 277/565 |
| 2020/0124179 | A1* | 4/2020 | Jimenez | F16J 15/3268 |
| 2020/0292002 | A1* | 9/2020 | Uemoto | F16C 33/7886 |
| 2020/0392999 | A1* | 12/2020 | Happ | F16C 33/7886 |

FOREIGN PATENT DOCUMENTS

| | | |
|---|---|---|
| EP | 2043880 B1 | 6/2012 |
| EP | 2541108 A1 | 1/2013 |
| EP | 2816248 A1 | 12/2014 |
| WO | 2009140996 A1 | 11/2009 |

* cited by examiner

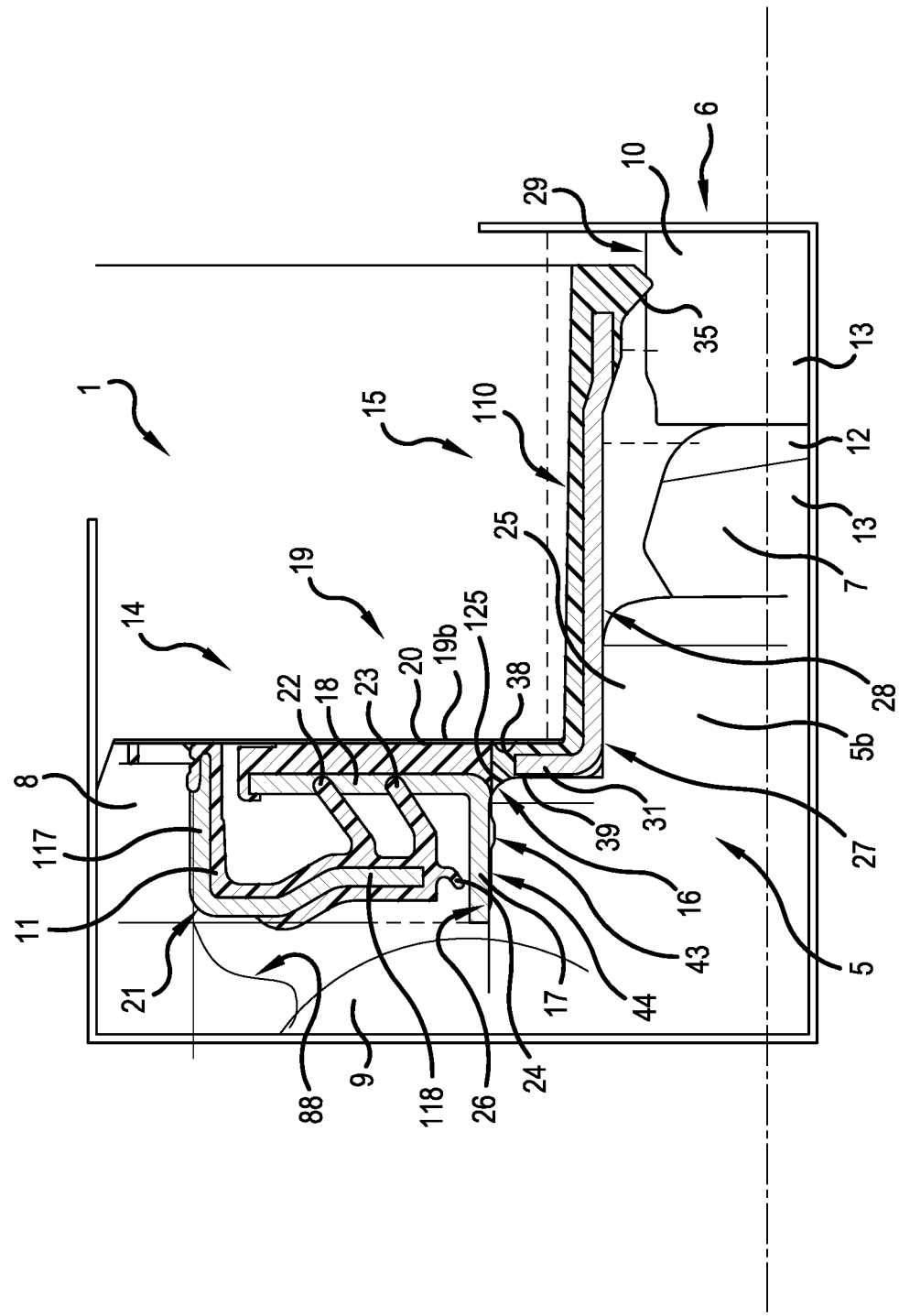

LOW-FRICTION SEALING DEVICE FOR WHEEL HUB ASSEMBLIES CONNECTED TO CONSTANT-VELOCITY JOINTS

CROSS-REFERENCE TO RELATED APPLICATIONS

This application claims priority to Italian patent application no. 102018000008427 filed on Sep. 10, 2018, the contents of which are fully incorporated herein by reference.

FIELD OF THE INVENTION

The present invention relates to a low-friction sealing device for wheel hub assemblies connected to constant-velocity joints.

Wheel hub assemblies support on one side a wheel of a vehicle and, in the case where the wheel is a driving wheel, are angularly connected to an associated constant-velocity joint for transmission of the driving torque from the drive shaft to the wheel. Wheel hub assemblies have an axis of rotation and include an inner ring and an outer ring which are coaxial with each other and with the axis of rotation and rotatable relative to each other owing to the arrangement, between them, of two rows of revolving bodies.

The inner ring is a flanged inner ring for allowing connection of a wheel to the assembly and provides a flange transverse to the axis of rotation, a journal which extends along the axis of rotation and which is made as one piece and of the same material as the flange, and an insert ring (also called small inner ring—"SIR") that is mounted on the journal axially on the opposite side to the flange relative to the journal and is axially locked against a shoulder of the journal by a rolled edge.

BACKGROUND OF THE INVENTION

The transmission of the driving torque from the constant-velocity joint to the wheel hub assembly is performed by mating toothed means for transmission of the movement, which are present on the adjacent and facing ends of the wheel hub and the outer ring of the constant-velocity joint; the toothed means may consist of a conventional splined coupling or a pair of front teeth which engage end-to-end, as illustrated in WO2009/140996, EP2042755, EP2043880 or also EP2816248.

In particular, in the case where front teeth are present, the joining zone between wheel hub and constant-velocity joint must be protected from the infiltration of external contaminants (water, dust, mud, dirt); the same is true for the revolving bodies arranged in between the inner ring and the outer ring, which is provided with means for fixing to the upright of the suspension.

The protection is obtained according to EP2816248 by means of a sealing device comprising first sealing assembly arranged, during use, between an inner ring and an outer ring of the wheel hub, and a second sealing assembly mounted, during use, integrally on the inner ring and arranged straddling the wheel hub and an outer ring of the constant-velocity joint; wherein the first sealing assembly includes a shield fixed by means of its sleeve portion respectively to the inner ring of the wheel hub and having a flange portion which extends radially projecting from the sleeve portion, and a signal generating element consisting of an annular insert mounted externally on the flange portion facing the constant-velocity joint and extending axially projecting above part of an annular step formed, on the same side as the constant-velocity joint, on a radially outer side surface of the inner ring, in a position immediately adjacent to the sleeve portion of the shield; and wherein the second sealing assembly includes a tubular support having a first end for keying, during use, the tubular support integrally onto the inner ring and provided radially on the outside with an edge folded in the manner of an L and shaped so as to engage inside an annular seat defined between the annular step of the inner ring and the annular insert extending axially projecting above part of the annular step.

This projecting part of the annular insert may be provided with an annular boss which extends projecting at least partly within the annular step, substantially flush with the L-shaped folded edge to define a static labyrinth seal for protecting the joint between the sleeve portion of the shield and the inner ring of the wheel hub.

The solution according to EP2816248, although satisfactory, not only does not manage entirely to prevent the infiltration of liquids and contaminants between the sleeve portion of the shield and the inner ring of the wheel hub, but also requires an uneconomical process for production of the signal generating element.

BRIEF SUMMARY OF THE INVENTION

The object of the present invention is to provide a sealing device for wheel hub assemblies connected to constant-velocity joints which does not have the drawbacks described and which is not only low-cost and very easy to manufacture, but also ensures a high degree of protection.

According to the invention, therefore, a sealing device for wheel hub assemblies connected to constant-velocity joints is provided, as defined in claim 1.

BRIEF DESCRIPTION OF THE SEVERAL VIEWS OF THE DRAWING

Further characteristic features and advantages of the present invention will emerge more clearly from the description which follows of a non-limiting example of embodiment thereof, provided with reference to the FIGURE of the attached drawing, which shows in schematic form a radially sectioned longitudinal view of a sealing device according to the invention applied to a wheel hub assembly connected to a constant-velocity joint, which are shown only partially for simpler illustration.

DETAILED DESCRIPTION OF THE INVENTION

With reference to the abovementioned FIGURE, 1 denotes in its entirety a sealing device for a wheel hub assembly 3, which is known and therefore shown only in schematic form, an inner ring 5 of which is operationally connected to rotate integrally therewith to a constant-velocity joint 6, which is known and therefore shown only partly for simpler illustration. The wheel hub assembly 3 further includes an outer ring 8 mounted coaxial and concentric with the ring 5, radially on the outside of the ring 5, and a plurality of revolving bodies 9 arranged between the rings 5 and 8. The inner ring 5 includes a ring 5b, which is formed as a an independent element axially locked by a rolled edge 7 and delimited externally by a cylindrical outer side surface 26, while the constant-velocity joint 6 includes an outer ring 10 (the only part of the constant-velocity joint 6 which is shown in the drawing) having a cylindrical outer side surface 29, arranged normally substantially coaxial with the ring 5, and a front toothed coupling 12 with the inner ring 5, formed on mutually adjacent portions 13 of the edge 7 and the outer ring 10.

The device 1 includes a first sealing assembly 14 arranged between the inner ring 5 (in this case the ring 5b) and the outer ring 8 so as to protect the revolving bodies 9, and a second sealing assembly 15 mounted integrally on the inner ring 5 (in this case the ring 5b) and arranged straddling the wheel hub 3 and the outer ring 10 of the joint 6.

The sealing assembly 14 includes: two shields 16 and 21 arranged facing each other and keyed respectively onto the inner ring 5 and inside the inner ring 8; and an annular sealing element 11 mounted, in the non-limiting example shown, integrally on the shield 21 and comprising a plurality of annular lips 22,23,24 cooperating with the shield 16.

The shield 16 is L-shaped, viewed in radial cross-section, and includes in turn a sleeve portion 17 fixed to the surface 26 and a flange portion which extends radially projecting on the outside from the sleeve portion 17 and towards the outer ring 8.

The shield 21 is also L-shaped, viewed in radial cross-section, and includes in turn a sleeve portion 117 fixed angularly integrally and in a fluid-tight manner to the ring 8, in particular within a front annular seat 88 of the outer ring 8 directed towards the constant-velocity joint 6, and a flange portion 118, which extends radially projecting on the inside of the sleeve portion 117 on the opposite side to the constant-velocity joint 6 and towards the inner ring 5.

The flange portion 18, which is arranged facing the flange portion 118 and inside the seat 88 supports, on a respective front surface 20 directed towards the joint 6, an element for generating a signal (in the example shown a magnetic signal) defined by a flat annular insert 19b which has a substantially rectangular radial cross-section with a constant axial thickness and is made of a magnetizable synthetic plastic or elastomer material which has been magnetized and fixed to the surface 20. The annular insert 19b has either a plurality of magnetized and non-magnetized zones, alternating with each other about an axis A, or a plurality of opposite-polarity magnetized zones; once the annular insert or element 19b is operationally connected to a sensor, known and not illustrated, this sensor transduces the magnetic signal, providing the speed of rotation of the ring 5.

Based on the above description, the shields 16 and 21 are therefore fixed by means of their respective sleeve portions 17 and 117 respectively to the inner ring 5 and to the outer ring 8 of the wheel hub 3 and the respective flange portions 18 and 118 of each shield 16 and 21 extend radially projecting from the sleeve portions 17 and 117 towards the other shield.

The second sealing assembly 15 includes a tubular support 28 having a first end 27 located on the opposite side to the joint 6 and a second end opposite to the end 27 and therefore directed towards the joint 6.

The tubular support 28 is generally made of a pressed metallic material, is keyed integrally onto the inner ring 5, in the manner which will be described below, by means of the end 27 and extends axially projecting from the ring 5 (from the ring 5b in particular), coaxially with the ring 5 and towards the joint 6, around the portions 13 of the wheel hub 3 and the joint 6.

According to the invention, the sealing device 1 includes, as an integral part thereof, an annular step 25 formed on the same side as the constant-velocity joint 6, on the radially outer side surface 26 of the inner ring 5 (in this case, of the insert ring or small inner ring SIR 5b), in a position immediately adjacent to the sleeve portion 17 of the shield 16.

In combination, the end 27 of the tubular support 28 is keyed integrally onto the inner ring 5 of the wheel hub 3 precisely in the region of the annular step 25, embedded in a fluid-tight manner, for example with a slight interference, on the step 25 and is provided radially on the outside with an edge 31 folded in the manner of an L and shaped so as to face the annular insert 19b mounted on the flange portion 17 of the shield 16, which annular insert 19b extends axially projecting above part of the annular step 25, as can be clearly seen in the FIGURE, and therefore projects axially over its entire axial thickness, within the axial extension of the step 25 on the surface 26.

In this way, the entire end 27 of the tubular support 28, and in particular its L-shaped folded edge 31, are entirely contained within the outer profile of the annular insert 19b, and, moreover, the end 27 of the tubular support 28 is engaged in a fluid-tight manner against and on the annular step 25 and cooperates axially abutting against an axial shoulder 125 defined, towards the constant-velocity joint 6, by the annular step 25.

Moreover, the annular insert 19b forming the signal generating element 19 is made as an annular insert of predefined thickness, measured in the axial direction, which covers entirely the surface 20 and extends with its radially inner edge 43 so as to be flush with a radially inner side surface 44 of the sleeve portion 17 of the shield 16.

In order to ensure the fluid-tight protection of the adjacent portions of the inner ring 5 and the shield 16, i.e. of the sleeve 17 with the shield 16, and of the adjacent portions of the inner ring 5 and the joint 6 (with the associated front toothed coupling 12), the second sealing assembly 15 further includes an annular sealing gasket 110 made of elastomer material and mounted, in the non-limiting example shown, integrally on the support 28 and comprising an elastically deformable annular lip 38 cooperating, in the manner which will be described below, with the annular insert 19b, and annular spur 35 which extends radially projecting from the second end 36, towards the inside of the support 28 and on the opposite side to the L-shaped folded edge of the first end 27, so as to come into interfering contact with the substantially cylindrical outer side surface 29 of the outer ring 10 of the joint 6 and form thereon a static radial seal.

The annular lip 38 extends obliquely and radially projecting from the edge 31 so as to come into interfering contact with the substantially cylindrical radially inner edge 43 of the annular insert 19b and completely isolate in a fluid-tight manner the adjacent portions of the inner ring 5 and the shield 16 from the outside. According to a further aspect of the invention, the annular lip 38 also has an annular stem 39 which is compressed between the shoulder 125 and the folded edge 31 so as to prevent direct axial contact between the shoulder 125 and the support 28 while ensuring the necessary fluid-tightness. In particular, the L-shaped folded edge 31 is designed to define a first pressing shoulder for mounting the sealing assembly 15 on the inner ring 5. In this way the shoulder defined by folded edge 31 is mounted on the end 27 of the support 28 which, during use, is directed in the assembly direction. Moreover, once assembly has been performed, the edge 31, along with the lip 38, remain totally enclosed within the axial volume of the annular element 19 and therefore do not cause any increase in the axial volume of the support 28.

In addition to the embodiments of the invention, as described above, it is to be understood that numerous further variants are possible. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A sealing device for a wheel hub configured to be connected to a constant-velocity joint, comprising:
    a first sealing assembly disposed between an inner ring and an outer ring of the wheel hub, and
    a second sealing assembly mounted on the inner ring and arranged straddling the wheel hub and an outer ring of the constant-velocity joint;
    wherein the first sealing assembly includes a first shield fixed by a respective sleeve portion to the inner ring of the wheel hub and having a respective flange portion that extends radially projecting from the sleeve portion, and a signal generating element comprising an annular insert mounted externally on the flange portion facing the constant-velocity joint and extending axially projecting above part of an annular step formed, on a same side as the constant-velocity joint, on a radially outer side surface of the inner ring, in a position immediately adjacent to the sleeve portion of the first shield;
    wherein the second sealing assembly includes a tubular support having a first end,
    wherein the tubular support is integrally keyed onto the inner ring, the first end of the tubular support being provided radially on the outside with an edge folded in the manner of an L and shaped to engage inside the annular insert mounted on the flange portion of the first shield;
    wherein the second sealing assembly includes an annular sealing gasket made of an elastomer material and mounted integrally on the support to ensure a fluid-tight protection of adjacent portions of the inner ring and the shield and adjacent portions of the inner ring and the joint, and
    wherein the signal generating element comprises either a plurality of magnetized and non-magnetized zones alternating about an axis, or a plurality of opposite-polarity magnetized zones alternating around the axis.

2. The device according to claim 1, wherein the annular sealing gasket includes an elastically deformable annular lip that slidingly seals against the annular insert.

3. The device according to claim 2, wherein the annular lip extends obliquely and projects radially from the edge to come into interfering contact with a substantially cylindrical, radially inner edge of the annular insert and isolates in a fluid-tight manner the adjacent portions of the inner ring and the shield from the outside.

4. The device according to claim 3, wherein the annular lip has an annular stem that is compressed between a shoulder of the inner ring and the edge to prevent direct axial contact between the shoulder and the tubular support while ensuring fluid-tightness.

5. The device according to claim 1, wherein the annular sealing gasket includes an annular spur, which extends radially inward from a second end of the tubular support on the opposite side to the L-shaped folded edge of the first end, to come into interfering contact with a substantially cylindrical outer side surface of the joint and form a static radial seal thereon.

6. A sealing device for a wheel hub configured to be connected to a constant-velocity joint, the sealing device comprising:
    a first sealing assembly disposed between an inner ring and an outer ring of the wheel hub, and
    a second sealing assembly mounted on the inner ring and configured to overlie an outer ring of the constant-velocity joint;
    wherein the first sealing assembly includes a first shield having a sleeve portion and a flange, the sleeve portion being configured to fix the first shield to the inner ring of the wheel hub and the flange portion projecting radially from the sleeve portion, the first sealing assembly further including a signal generating element comprising an annular member mounted on a side of the flange portion facing the constant-velocity joint, the annular member extending axially over an annular step formed on a radially outer side surface of the inner ring,
    wherein the second sealing assembly includes a tubular support mounted to the inner ring and having a first end, the first end being provided radially on the outside with an edge folded in the manner of an L, the edge being located inside the annular insert,
    wherein the second sealing assembly includes an annular elastomeric sealing gasket mounted integrally on the tubular support and having a radially inwardly extending lip configured to form a seal with the joint, and
    wherein the signal generating element comprises either a plurality of magnetized and non-magnetized zones alternating about an axis, or a plurality of opposite-polarity magnetized zones alternating around the axis.

7. The device according to claim 6,
wherein the annular sealing gasket includes an elastically deformable annular lip that slidingly abuts against the annular member.

8. The device according to claim 6,
wherein the annular sealing gasket includes an elastically deformable annular lip that slidingly abuts against a substantially cylindrical inner surface of the annular member.

9. The device according to claim 8,
wherein the annular sealing gasket includes an annular stem compressed between a shoulder of the inner ring and the edge.

10. The device according to claim 6,
wherein the annular sealing gasket includes an annular stem compressed between a shoulder of the inner ring and the edge.

* * * * *